United States Patent
Abu Hamam (10) Patent No.: US 10,902,400 B2
(45) Date of Patent: Jan. 26, 2021

(54) REMOTELY CONTROLLABLE ARTICLE DISPENSING SYSTEMS, DEVICES, AND METHODS

(71) Applicant: Nezar Abu Hamam, Coin (ES)

(72) Inventor: Nezar Abu Hamam, Coin (ES)

(*) Notice: Subject to any disclaimer, the term of this patent is extended or adjusted under 35 U.S.C. 154(b) by 0 days.

(21) Appl. No.: 15/700,242

(22) Filed: Sep. 11, 2017

(65) Prior Publication Data
US 2018/0137492 A1    May 17, 2018

Related U.S. Application Data (60) Provisional application No. 62/423,208, filed on Nov. 17, 2016.

(51) Int. Cl.
*G06Q 20/20* (2012.01)
*G06Q 10/08* (2012.01)
(Continued)

(52) U.S. Cl.
CPC ......... *G06Q 20/203* (2013.01); *G06Q 10/087* (2013.01); *G06Q 20/207* (2013.01);
(Continued)

(58) Field of Classification Search
CPC .. G06Q 20/203; G06Q 30/0268; G06Q 30/02; G06Q 20/32; G06Q 20/40145;
(Continued)

(56) References Cited

U.S. PATENT DOCUMENTS 7,805,378 B2 * 9/2010 Berardi ............... G06Q 20/00
700/232
8,032,397 B2 * 10/2011 Lawless ............. G06F 19/3418
705/3
(Continued)

FOREIGN PATENT DOCUMENTS

JP    2002 312835 A    10/2002
JP    2003 217010 A     7/2003
(Continued)

OTHER PUBLICATIONS

Extended Supplemental Search Report In Corresponding EP Application 17190584.7-1871 (Prepared in English).

*Primary Examiner* — Michael Collins (57) ABSTRACT

A system including a network of article or service dispensing devices connected for two way communication with a central hub in which article or service selection requests are received from user's smart devices or from input units at the dispensing devices, dispensing devices suitable for use in the system, and a method of controlling transactions using the system. Capabilities include transmission of inventory and operational status information from the dispensing devices, verification that legal and commercial requirements for the desired transaction are met, providing information to tax authorities, and providing information to owners of or those maintaining the system on which to base stocking decisions, and to owners of brands available in dispensing devices from which targeted promotional materials can be selected, and delivered to a user while a transaction is in progress.

29 Claims, 7 Drawing Sheets

(51) Int. Cl.
  *G07F 11/00* (2006.01)
  *G06Q 40/00* (2012.01)
  *G06Q 30/02* (2012.01)
  *G06Q 20/32* (2012.01)
  *G07F 9/02* (2006.01)
  *G06Q 20/40* (2012.01)
  *G07F 9/00* (2006.01)
  *G06Q 50/00* (2012.01)

(52) U.S. Cl.
  CPC ....... *G06Q 20/32* (2013.01); *G06Q 20/40145* (2013.01); *G06Q 30/02* (2013.01); *G06Q 30/0268* (2013.01); *G06Q 40/123* (2013.12); *G07F 9/002* (2020.05); *G07F 9/026* (2013.01); *G06Q 50/01* (2013.01)

(58) Field of Classification Search
  CPC .. G06Q 40/123; G06Q 10/087; G06Q 20/207; G06Q 50/01; G07F 9/026; G07F 9/002
  USPC .................................................. 700/231–244
  See application file for complete search history.

(56) References Cited

U.S. PATENT DOCUMENTS

| | | | |
|---|---|---|---|
| 8,600,899 B1 | 12/2013 | Davis | |
| 9,262,771 B1 | 2/2016 | Patel | |
| 9,708,170 B2* | 7/2017 | Segiet | B67D 3/0077 |
| 10,319,173 B2* | 6/2019 | Adelberg | G07F 9/002 |
| 2003/0057226 A1 | 3/2003 | Long | |
| 2003/0169180 A1 | 6/2003 | Hardman | |
| 2003/0130760 A1 | 7/2003 | Tommas | |
| 2004/0153421 A1 | 8/2004 | Robinson | |
| 2007/0050083 A1 | 3/2007 | Signore et al. | |
| 2010/0138037 A1* | 6/2010 | Adelberg | G06Q 10/087 700/241 |
| 2010/0234986 A1* | 9/2010 | Clopton | G06Q 10/087 700/236 |
| 2011/0320037 A1 | 12/2011 | Frugone | |
| 2012/0004769 A1* | 1/2012 | Hallenbeck | G07F 11/62 700/232 |
| 2012/0046787 A1* | 2/2012 | Berrio | G06Q 20/10 700/237 |
| 2012/0136478 A1* | 5/2012 | Anand | G06Q 20/425 700/237 |
| 2013/0096715 A1* | 4/2013 | Chung | G06Q 30/02 700/233 |
| 2013/0144432 A1* | 6/2013 | Canter | G07F 9/026 700/236 |
| 2014/0081449 A1* | 3/2014 | Maskatia | G06Q 20/18 700/232 |
| 2014/0089142 A1* | 3/2014 | Jackovin | G06Q 30/0281 705/26.61 |
| 2015/0045946 A1* | 2/2015 | Maskatia | A63F 9/24 700/236 |
| 2015/0105902 A1* | 4/2015 | Maskatia | G06Q 30/02 700/236 |
| 2015/0287007 A1 | 10/2015 | Suraukal et al. | |
| 2016/0086418 A1* | 3/2016 | Smolen | G06Q 20/065 700/237 |
| 2018/0232716 A1* | 8/2018 | Conforti | G06Q 20/203 |

FOREIGN PATENT DOCUMENTS

| | | |
|---|---|---|
| KR | 2007 0037835 A | 4/2007 |
| WO | WO 2015/186141 A1 | 12/2015 |

\* cited by examiner

REMOTELY CONTROLLABLE ARTICLE DISPENSING SYSTEMS, DEVICES, AND METHODS

RELATED APPLICATIONS

This application claims the benefit of U.S. Provisional Patent Application No. 62/423,208 filed on Nov. 17, 2016. The disclosure of this prior application is considered part of and is incorporated by reference in the disclosure of this application.

FIELD OF THE INVENTION

The present invention, in some embodiments thereof, relates generally to selectable article dispensing systems, and more particularly to systems that can be controlled remotely to deliver selected items and information to and from a person using the system and to provide inventory management and operational status information for the system manager. According to some embodiments, the invention is applicable to vending machine systems that can be activated using smart devices.

For purposes of the following description, vending machine systems according to the invention will sometimes be referred to as "Market Merchandising Element Dispensing Systems" or "MMEDS". The term "user" is to be understood to apply to individuals seeking to obtain a selected item from an article dispensing system according to the invention. The term "system manager" is to be understood as including entities that own or service the system, while suppliers of articles available for selection by a user, are referred to as brand owners.

BACKGROUND OF THE INVENTION

Vending machines and other merchandising element dispensing machines have long been known in the art. Typically, these devices were coin operated dispensing machines which dispensed a selected product after cash was introduced into a money box. In some cases, they were mechanically activated, as by pulling a selected lever. More modern machines were operated electrically, for example, with a keypad.

With the advent of cellular telephones and the growing popularity of other portable smart devices, merchandising element dispensing machines were developed that dispensed a selected product after payment via a cellular phone account or using a credit card.

However, these machines were actuated and maintained as individual machines, with no contact or intercommunication with one another or with a central hub. Typically, a vendor and/or machine manager would visit each machine to determine which products were dispensed and must be replaced. Vending machine companies would benefit greatly from a system that would allow remote inventory management, Further, while targeted marketing (i.e., directing advertising to potential patrons according to their apparent interests) has adapted itself easily to the online world though mechanisms such as social media and internet search engines, this has essentially eluded the vending machine industry. Gaining this capability would also greatly benefit the industry.

The present invention seeks to satisfy these needs.

SUMMARY OF THE INVENTION

There is provided according to the present invention a remotely controlled system for dispensing articles or services having a central hub including a server running software for implementing service functionality and at least one article dispensing device at selected location. The dispensing device being connected to the hub server by a communication channel, and including a processing unit responsive to external commands to operate the dispensing device. The hub server is responsive to item selection requests provided from a user's smart device over a communication channel and the dispensing device processing units cooperate to provide one or more of: accessing one or more payment verification services selected by a potential user, transferring a payment from the user to an account of a system manager, delivering a selected item to a user, and providing the system manager with inventory and operational status information for the dispensing devices to alert the system manager to the need to restock or repair the dispensing device.

According to exemplary embodiments of the invention, the dispensing device processing units and the hub server in the remotely controlled system for dispensing articles or services, further cooperate to provide one or more of: providing information to tax authorities concerning taxable transactions; accessing a data source to obtain positive identification of a potential user and his or her age and/or compliance with other legal requirements applicable to a requested transaction; subject to prior approval of a user, providing system managers and owners of brands available for delivery by the dispensing devices to receive information through the hub as to past item and/or brand selection patterns of particular users from dispensing devices or other sources and responsively, to provide targeted advertising messages on a display unit of the dispensing device or on the user's smart device; and providing the system managers item selection pattern data from the dispensing devices at different locations from which decisions can be made as to what items should be available in dispensing devices in the particular locations.

According to exemplary embodiments of the invention, the positive identification based on biometric data is obtained by an input unit at a dispensing device. According to exemplary embodiments of the invention the dispensing devices are market merchandising element dispensing systems (MMEDS). According to exemplary embodiments of the invention, the hub server is responsive to commands from software resident on the user's smart device or to commands from the user's smart device provided through conventional web access services or to commands directly inputted by a user through a dispensing device. According to exemplary embodiments of the invention, the hub includes back office server functionality for brand owners operative to perform selected data analysis functions. According to exemplary embodiments of the invention, the central hub is a dedicated website or is accessible as a service of one or more social media websites.

There is provided according to the present invention an article dispensing device having storage units for deliverable items; and a processing unit connectable to a central hub through a communication channel; wherein the processing unit is remotely controllable by transaction request instructions delivered through the communication channel and originating from a user's smart device or to instructions provided through an input device that is part of the dispensing device itself to initiate verification that the requested transaction is legally permissible, and satisfies commercial conditions, and to deliver the requested item if legal and commercial conditions are satisfied, and wherein the processing unit is further operative to provide operational status to the hub and responsive to completion of a transaction, to transmit inventory status information to the hub.

According to exemplary embodiments of the invention, the article dispensing device is an MMED. According to exemplary embodiments of the invention the article dispensing device further includes a biometric data input unit. According to exemplary embodiments of the invention the article dispensing device further including a display unit by which a message may be delivered to users as text and/or verbally.

There is also provided, according to the invention, a method of operating an article distribution system to conduct a transaction by delivery of an item or service selected by a user from among one or more available options, the selection being made using a smart device, the method comprising the steps of disposing at least one dispensing device including a processing unit in a selected location; establishing a communication channel between the dispensing device and a central hub; transmitting a user selection request to the dispensing device through the communication channel; verifying that the requested transaction is legally permissible; transmitting approval for the transaction through the communication channel to the dispensing device; delivering the selected item or service to the user in response to the transmitted approval; and transmitting inventory status information from the dispensing device to the hub server.

According to exemplary embodiments, the method further includes transmitting operational status information form the dispensing device to the hub server. According to exemplary embodiments, the transaction is controlled by software running on the hub server accessed by the user through available web access software alone or in cooperation with software running on a user's smart device or accessed through an input device in the dispensing device.

According to exemplary embodiments, the method further includes determining if the transaction is subject to an age requirement, and if it is, obtaining a positive identification of the user by the dispensing device; transmitting the identification information to the hub server; correlating the identification data with data in a database containing verified age data for the user; and transmitting permission for the transaction to the dispensing device if there is a match between the age data and the user identification data.

According to exemplary embodiments, the user identification data is obtained by a biometric scan performed by the dispensing device or the user's smart device.

According to exemplary embodiments, the method further includes, subject to prior approval by the user, delivering a targeted promotional message to the user during the transaction, the content of which is determined at least in part by information about the user's prior selection of items from delivery devices and by other information likely to be reflective of the user's interests.

According to exemplary embodiments, the message is delivered to the user by way of his or her smart device or a display unit that is part of the dispensing device.

According to exemplary embodiments, the method further includes collecting data reflective of tax due on transaction at a dispensing device in the system; transmitting the collected information to a relevant tax authority; and transferring the tax due to an account of the tax authority.

According to exemplary embodiments, the method further includes establishing back office server capability for brand owners, wherein the back offices provide functions selected by the respective brand owners.

BRIEF DESCRIPTION OF THE DRAWINGS

The present invention will be further understood and appreciated from the following detailed description taken in conjunction with the drawings in which.

DETAILED DESCRIPTION OF THE INVENTION

Introductory Overview

The present invention, in some embodiments thereof, relates generally to selectable article dispensing systems, and more particularly to systems that can be controlled remotely to deliver selected items and information to and from a person using the system and to provide inventory management and operational status information for the system manager and/or for a brand owner. According to some embodiments, the invention is applicable to vending machine systems that can be activated using smart devices.

As previously noted, for purposes of the following description, vending machine systems according to the invention will sometimes be referred to as "Market Merchandising Element Dispensing Systems" or "MMEDS" and the term "user" is to be understood to apply to individuals seeking to obtain a selected item from an article dispensing system according to the invention. The term "system manager" is to be understood as including entities that own or service the system, while a supplier of articles available for selection by a user, is referred to as a "brand owner" or "vendor".

MMEDS according to the present invention include dispensing systems for hot and cold foods, alcoholic and non-alcoholic beverages, tobacco products, health care products and a variety of other articles. They may be in the form of conventional vending machines or in other forms such as mini-coolers, coolers, dispensers, fountain dispensers, chest coolers, merchandisers, freezers, or other similarly-functioning devices such as lockers, industrial vending machines, etc.

The MMEDS may be at fixed locations or they may be mobile and movable by a towing or carrying vehicle or in the form of self-powered vehicles.

According to an aspect of some embodiments of the invention, there is provided a system comprised of a central hub, a plurality of remotely located article dispensing devices, each dispensing device including a processor, a communication channel, and computer software operative to provide intercommunication between the hub, users, the dispensing devices and system managers According to some embodiments, the systems include at least one, and preferably a plurality of MMEDS, as described above.

According to some embodiments, the software runs on a server located at the central hub. Optionally, the software includes an application ("app") downloadable to run on user smart devices.

According to some embodiments, the central hub is a dedicated website. Optionally, it may be accessible as a service of one or more social media websites. It may be accessible for third party integrations through APIs, server-to-server, architecture, etc.

According to some embodiments, the smart devices are, for example, smart phones, tablets, phablets, PDAs (Personal Digital Assistants), desktop and laptop computers, and more exotic devices such as wearables, 3D holograph interfaces (clothing and accessories incorporating computer and advanced electronic technologies), for example, smart watches and the like.

According to some embodiments, all the software, including the app, runs on a server comprised in the central hub and is accessible by a user's smart device over the internet through an internet service provider or a telecommunication service provider.

According to some embodiments, two-way communication is effected over wired communication channels. According to other embodiments, the communication channels are wireless.

According to some embodiments, the software and the hub can provide services for multiple system managers and/or brand owners.

According to some embodiments, the software permits the dispensing device processors to provide one or more functions and/or services, including, but not limited to:
- accessing one or more payment verification services for a potential consumer;
- transferring a payment to an account of a brand owner;
- providing information to tax authorities concerning taxable transactions;
- delivering a selected item to a user;
- accessing a data source to obtain positive identification of a potential user and his or her age and or compliance with other legal requirements, for example, to assure that he or she is legally permitted to receive a desired item, for example, a tobacco product or alcoholic beverage, from the dispensing device;
- providing system managers and/or brand owners with inventory control and machine operational status information for their dispensing devices to alert them to the need to restock or repair the devices;
- subject to prior approval of a user, allowing system managers and brand owners to receive information through the hub as to past item and/or brand selection patterns of particular users from dispensing devices or other sources and responsively, to provide targeted advertising messages on a display unit of the dispensing device or on the user's smart device; and
- Allowing system managers and/or brand owners to receive item selection pattern data from dispensing devices at different locations from which decisions can be made as to what items should be available in dispensing devices in particular locations.

Anonymous users (traffic) around the MMEDS.

According to some embodiments, the delivery device includes an input device and the delivery device processor is operative to initiate positive identification based on biometric data obtained by the input device.

Other functions that can be provided according to the invention will be apparent to those skilled in the relevant arts.

According to some embodiments of the invention, the central hub includes middleware of various functionalities and the distribution devices include processors that create an automated system which converts otherwise passive assets, such as a number of conventional MMEDSs, into a network of digital access points through which users can obtain desired items using their personal smart devices. The system also provides a communication channel for real time conversations with the users.

The system architecture creates an intelligent network that allows Consumer Relationship Management (CRM) systems (including hardware and software to manage consumer data thereby allowing targeted marketing for vending machine system owners and owners of brands of the available items, as well as convenient remote inventory and system functionality management.

Systems according to the invention may be considered to be part of an Industrial Internet of Things and may also be considered to be part of a Block Chain architecture, as they include a network of physical objects embedded with electronics, software, sensors and connectivity to enable the objects to exchange data with a manufacturer (brand owner), service organizations, with or without human intervention.

According to another aspect of some embodiments of the invention, there are provided dispensing devices that are connectable to a central hub through a communication channel and which are remotely controllable through the channel by software installed on a server at the hub. Optionally, part of the software includes an app downloadable for installation on a user's smart device.

In some embodiments, the dispensing devices are MMEDS as defined above.

In some embodiments, the central hub is a dedicated website. Optionally, it may be accessible through one or more social media websites.

In some embodiments, the dispensing devices include sensors that provide data as to the current inventory of items available to potential users. In some embodiments, sensors are also included that provide operational status information.

According to some embodiments, the dispensing devices are responsive to queries from the central hub to transmit current sensor data to the hub over the communication channel. In some embodiments, the dispensing devices are operative to contact the hub to initiate data transmission.

In some embodiments, the dispensing devices are operable to transmit consumer identification and item selection data to the hub, and in response to display a targeted advertising or other message tailored to likely interest of the identified user.

In some embodiments, the dispensing devices are operable to deliver an item selected by a user in response to a confirmation message from the hub.

In some embodiments, the confirmation message concerns one or more of payment, consumer identity, legal permission to obtain the item, or other information.

In some embodiments, the dispensing devices include input units by which users can establish their identity. In some embodiments, the identification is provided by biometric data, for example, a facial, retinal or fingerprint scan.

In some embodiments, the dispensing devices include display units by which messages may be delivered to users.

According to a further aspect of some embodiments of the invention, there is provided a method of remotely controlling a dispensing device to deliver an item selected by a user from among several available items, the selection being made using a smart device.

According to some such method embodiments, a dispensing device including a processing unit and containing the items available for selection is placed at a desired location, When a user attempts obtain an item, the processor of the delivery device is connected through a communication channel to a central hub, and upon selection by a user of a desired item and verification of permission for the transaction, a delivery command is transmitted to the dispensing device from the central hub. In conjunction with delivery of the selected item, information is transmitted from the dispensing device processor to the central hub concerning the transaction.

According to some embodiments, the transaction is controlled by software running on a server at the hub. Optionally, the transaction is partially controlled by an app running on a user's smart device.

According to some embodiments, the transaction information transmitted to the hub includes, but is not limited to one or more of inventory status information, operational status information, and information about the user. Optionally, the user information includes identification of the item he or she selected.

According to some embodiments, transmission of the transaction information is initiated by the dispensing device processor. Optionally, transmission is initiated by a request from the central hub.

According to some embodiments, subject to prior approval by the user, a targeted message is delivered to the user by way of his or her smart device or a display unit that is part of the dispensing device.

According to some embodiments, the message transmitted to the user is determined in part by information about the user's prior selection of items from delivery devices. Optionally the message is also determined by other information about the user's interests.

According to some embodiments, the method further includes transmission to tax authorities of information about a transaction that is a taxable event.

According to some embodiments, approval for the transaction is based on verification of payment for the item. Optionally, the method further includes transferring the payment to the account of the system manager.

According to some embodiments, for transactions involving legally regulated age or other limits, approval of the transaction is based on verification of the identity of the user and confirmation that the user meets the legal requirements for the transaction. Optionally, verification of the user's identity is based biometric data obtained by an input unit comprised in the delivery device. Optionally, the biometric data is one or more of a facial, retinal or fingerprint scan.

DESCRIPTION OF EXEMPLARY
EMBODIMENTS

Figure 1A:
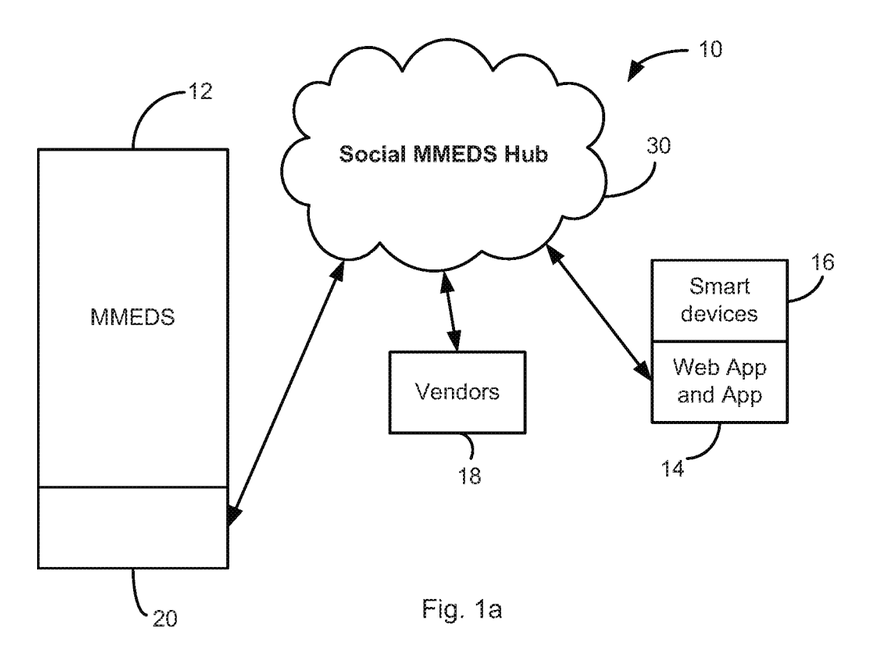
FIG. 1a is a schematic illustration of a merchandising element dispensing machine system constructed and operative in accordance with some embodiments of the present invention.

Referring now to FIG. 1a, there is shown a block diagram illustration of an embodiment of an article distribution system generally denoted at 10, according to the invention in the context of a MMEDS system.

System 10 includes a plurality of dispensing devices 12, only one of which is shown for clarity and ease of description by way of example only, a user smart device 16, a plurality of vendor data management systems, one of which is shown at 18 and designated for simplicity in the drawing as "vendors", and a central hub 30, shown by example, as a social MMEDS hub. Smart device 16 includes software, generally indicated at 14, which comprises conventional web access software by which hub 30 can be accessed to permit use of the system. Optionally, smart device software 14 may include a downloaded dedicated app by which the user can access the systems.

It should be understood that dispensing device 12 is shown by way of example as a MMED, but may be a dispensing device usable in other applications which can benefit from remote user interaction. Similarly, social MMEDS hub 30 may be a dedicated website. Also, the vendor data management systems may belong to multiple system owners, organizations that service the systems under contract and the owners of multiple brands of items available from different ones of dispensing devices 12. For clarity and ease of description, only one of each is illustrated in FIG. 1a.

It should also be understood that intercommunication between the systems components (represented by two-headed arrows) can be over wired land lines or wireless channels.

Dispensing devices 12 may take a variety of forms based on known electrically operated vending machine technology modified according to the principles of the present invention. Accordingly, each dispensing device includes a processing unit 20, which includes a plurality of sensors and actuators for controlling delivery of selected items, determining the inventory of available items, determining the operational status of the device, user identification, and intercommunication with hub 30. Unless otherwise indicated, the technologies employed for implementing the functions may be conventional, and their application will readily be understood by those skilled in the art.

Figure 1B:
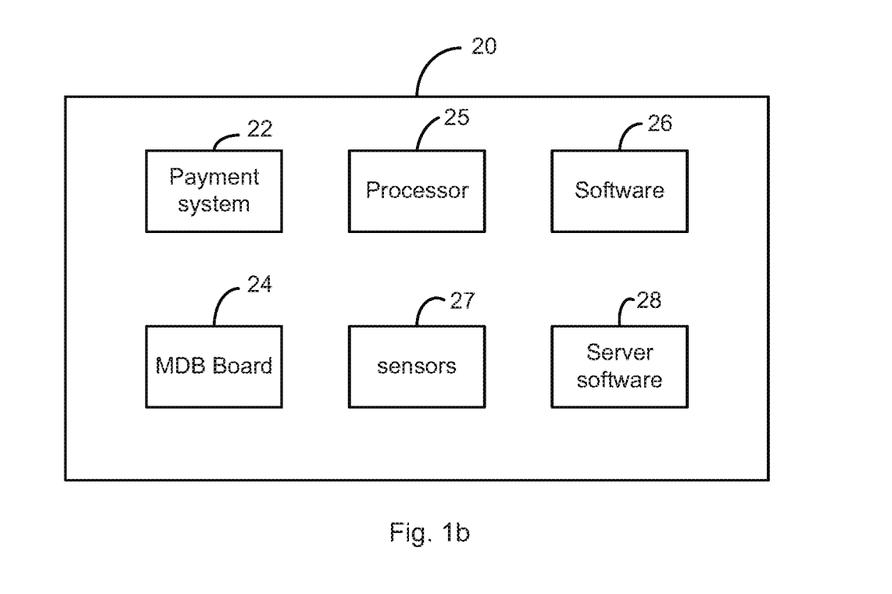
FIG. 1b is a detail block diagram illustration of a merchandising element dispensing machine controller according to some embodiments of the present invention.

One embodiment of a processing unit 20, which is described as an example in the context of a MMEDS, is illustrated in FIG. 1b. Unit 20 includes a payment verification system 22 that communicates with a complementary payment control system in hub 30, such as available from Nayax Ltd. of Hunt Valley. Md., U.S.A, or any other conventional remote payment system. Processing unit 20 also includes a system Main Distribution Board (MDB), which enables the communication and interactions between users and the dispensing device, typically, but not necessarily mediated by hub 30.

Processing unit 20 further includes a processor-controller 25 including necessary data storage, memory, and microprocessor units running customized system operating software 26. Processing unit 20 also includes a plurality of sensors 27, for example, one or more of item inventory counters for each of the available items, a temperature sensor, a humidity sensor, a magnetic sensor, a weight sensor, a detector, a receiver, a gyroscope, a 3D touch sensor, and a visual scanner for user biometric identification, etc. The sensors are coupled to hub 30, either directly or via processor-controller 25. Hub 30 also provides operating commands to dispensing unit 12 that are executed by controller-processor 25, as described in more detail below.

Referring again to FIG. 1a, as previously noted, processing unit 20 is connected for two-way communication to user smart devices 16 via hub 30, which includes a plurality of remote system servers and third party servers in the World Wide Web or Cloud. Each smart device 16 runs a system app 14 that can be downloaded or accessed through a web app that runs on a server associated with hub 30. A user can gain access to the system by a conventional registration process providing personal data or alternatively, without registration, if the system is configured for anonymous use. In the latter case, the hub software will obtain payment instructions, for example, a credit or debit card number, from the user. Upon confirmation that the payment request has been accepted, a permission notification is transmitted to payment verification system 22 and the dispensing device is activated to deliver the selected item.

One or more brand owners or vendors 18 are coupled for two-way communication to hub 30 for monitoring and communication with or through the various MMEDS. Alternatively, the vendors 18 may be in direct communication with the processing unit 20 in the MMEDS to collect information from that MMEDS and communicate directly with the smart device of the user.

Figure 2:
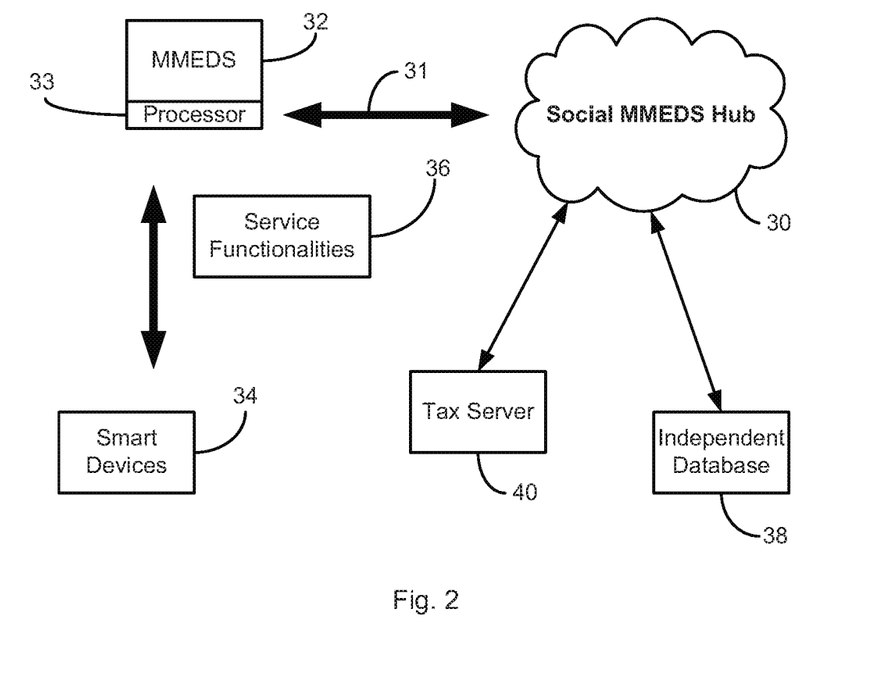
FIG. 2 is a block diagram illustration of a method of operation of a merchandising element dispensing machine system, according to some embodiments of the invention.

FIG. 2 is a block diagram that illustrates at a high level of abstraction several features of the method of the invention, one or more of which are implemented in various embodiments of the invention. Again, by way of example only, these are illustrated in the context of a MMEDS/Social Hub application.

In all such embodiments, overall operation is controlled by interaction of service functionalities software 36 optionally located in hub 30, transaction control software included in processor unit software 33 of dispensing device 32, and service request software 34 installed in a user's smart device. Optionally, however, the actual service request software may be part of service functionalities software 36. In the latter case, as will be understood by those skilled in the art, the service request software is accessed by whatever web browser application is available on the user's smart device The above software applications are coupled for two-way communication over wired or wireless channels, as previously explained, thereby providing the capability for online and offline management of user transactions, inventory control, and system maintenance alerts.

In addition to these functions, service functionalities software 36 may be programmed to provide several even more sophisticated functions according to some method embodiments. For example, two-way communication may be provided with one or more independent, database management systems 38 for verification and authentication of consumers' personal details. These details can be saved in hub 30 and used again for later transactions by the same user, without requiring accessing the external database again.

Thus, at the time a new user seeks access to the system, identification data including the user's name, and one or more of his or her mobile phone number, delivery address, and intended method of payment—e.g., credit card, debit card, PayPal, etc. may be required, depending on each case.

Beyond these basic data, additional information may be required if the user desires to conduct certain legally regulated transactions. Such transactions include purchases of alcoholic beverages, tobacco products, adult entertainment materials, lottery tickets, etc., which typically may not be engaged in by persons under certain ages. At present, either remote sellers choose not to offer such products for sale or must rely on the buyer's declaration of his or her age or other characteristic, with no way to determine whether that declaration is true or false. Thus, the vendor may unwittingly break the law by the illegal sale of prohibited products to those users. In none of the conventional applications known to Applicant, when the sale or free distribution of a good or service that can only be acquired by a person over a certain age is involved, is authentication of the user's age required, beyond a statement to that effect by the user and, possibly, a show of an identification document of one kind or another.

The present invention provides a method of authentication or verification of a user's age (and/or other personal data) independent of the user's statement. This is accomplished by accessing an independent, external database 38 to correlate a user's age and identity, for example, based on positive and objective identifying data obtained at the dispensing device location based on a biometric scan, for example, a fingerprint, retinal or facial image scan or through a similar scan by the user's smart device, if it has such capability.

Database 38 may be one maintained by a public or private entity so long as the age data has been verified from a reliable primary source, such as a birth certificate, or a secondary source, such as a passport, a drivers' license or government-issued identification.

As a further source of positive identity and age verification, a smart identification card can be programmed to provide both verified age and biometric data and the distribution device may include a compatible card reader. Before proceeding further, it should be noted that the user's interaction with the system can be accomplished using the touchscreen function of the smart device or voice recognition if that capability is available.

Figure 3:
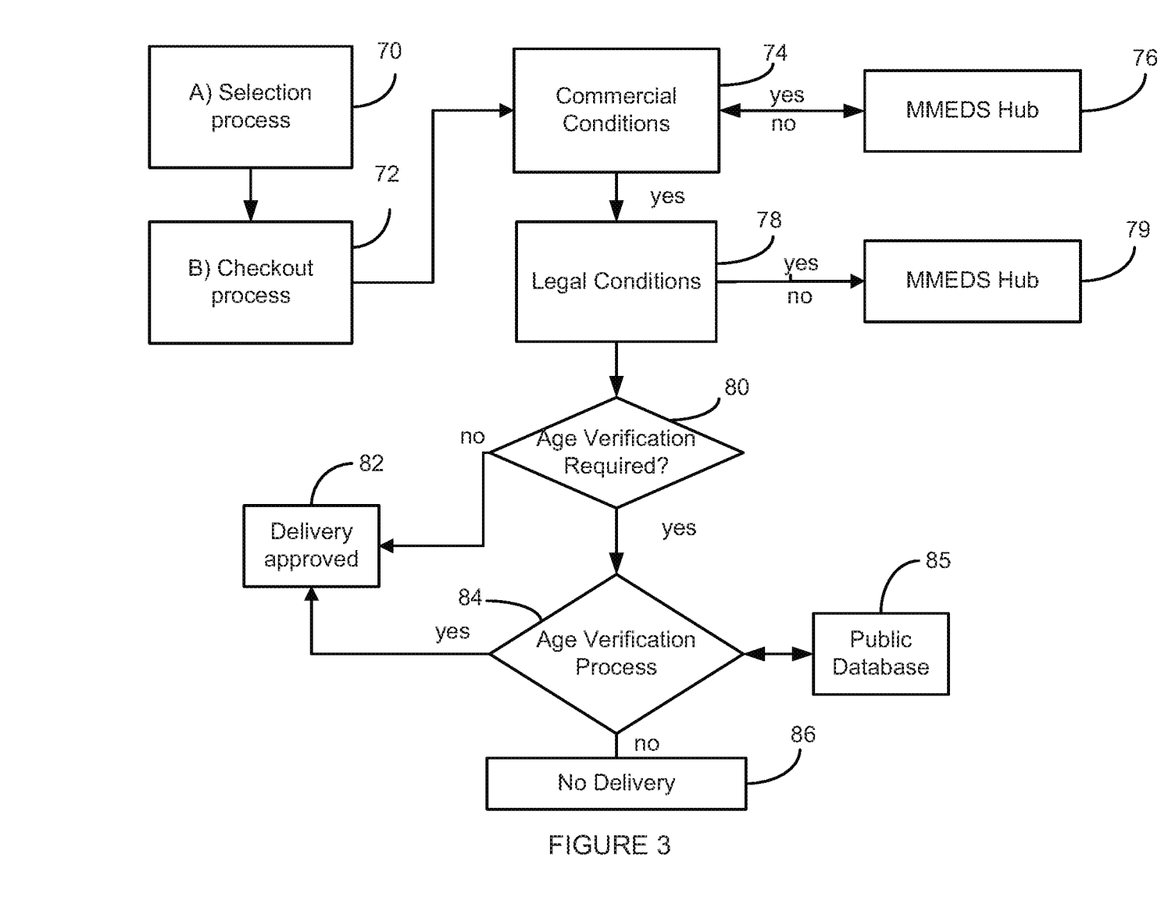
FIG. 3 is a schematic illustration of exemplary system architecture and an authentication method, according to embodiments of the invention.

With the foregoing in mind, an exemplary method according to some embodiments of the invention is shown schematically in FIG. 3.

First, the user selects the desired product or service using his or her smart device at the MMEDS (block 70).

This can be initiated in one of several ways. After the user accesses the system using the downloaded app or conventional internet access, he or she can be prompted to enter an identification code visible on a display device of the MMEDS or otherwise displayed on the device. Alternatively, a GPS-based location system can be used. As a further alternative, a listing of the locations of the MMEDS might be provided from which the user may make a selection. Other possibilities will be apparent as well to those skilled in the art.

Once the MMEDS intended to be used is identified, a list of available items is transmitted to the user. After the desired product or service has been selected, the MMEDS proceeds to the checkout process (block 72), in compliance with all required conditions, e.g., receipt from the user of acceptable identification. The user then selects proposed commercial terms (block 74), e.g., the method of payment and/or redemption (i.e., a gift certificate of some kind or a special offer). The commercial terms are verified for example, by a query through the central hub to a selected payment agency such as a credit card or a facility such as Pay Pal (block 76).

Then, legal conditions or requirements applicable to the desired transaction, if any, are checked (block 78). For example, the legal conditions can include the location and/or hour of the purchase. Data as to such conditions may be stored in a database associated with service functionalities processing unit 36 (see FIG. 2).

If the transaction meets the legal requirements (block 79), the system then determines if there is also a user age requirement (block 80). If there is no age requirement, the transaction is approved and the selected item is delivered to a receiving area or an access door is unlocked (block 82).

If age verification is required, an age verification process is carried out (block 84) via a public server and data base (block 85) for age verification. If the user's age is such that the transaction is permitted, the transaction is approved and the selected article is delivered or made accessible to the user (block 82). If the user's age cannot be verified or the user is under age, there will be no delivery (block 86).

Preferably, after a user enters his or her name and/or cellular phone number and/or personal identification number and/or delivery address and/or credit card details and/or finger print and/or any other biometric data and so forth, the user will be requested to give consent to have his details in the external database accessed by the vendor. Such consent may be obtained in advance at the time of user's registration. In some embodiments, absent proper consent, the transaction is aborted.

It should also be appreciated that access to public or confidential records will be made in compliance with the legal standards on protection of personal data required by the database owner for similar situations. Optionally, suitable encryption may be employed by the database owner. Optionally, personal information communicated between the dispensing device and the central hub may also be encrypted.

According to some embodiments of the invention, items can be preordered for later pickup. A user might, for example, preorder theater, movie or concert tickets for pickup at his or her convenience at a location other than the venue of the performance.

Figure 4A:
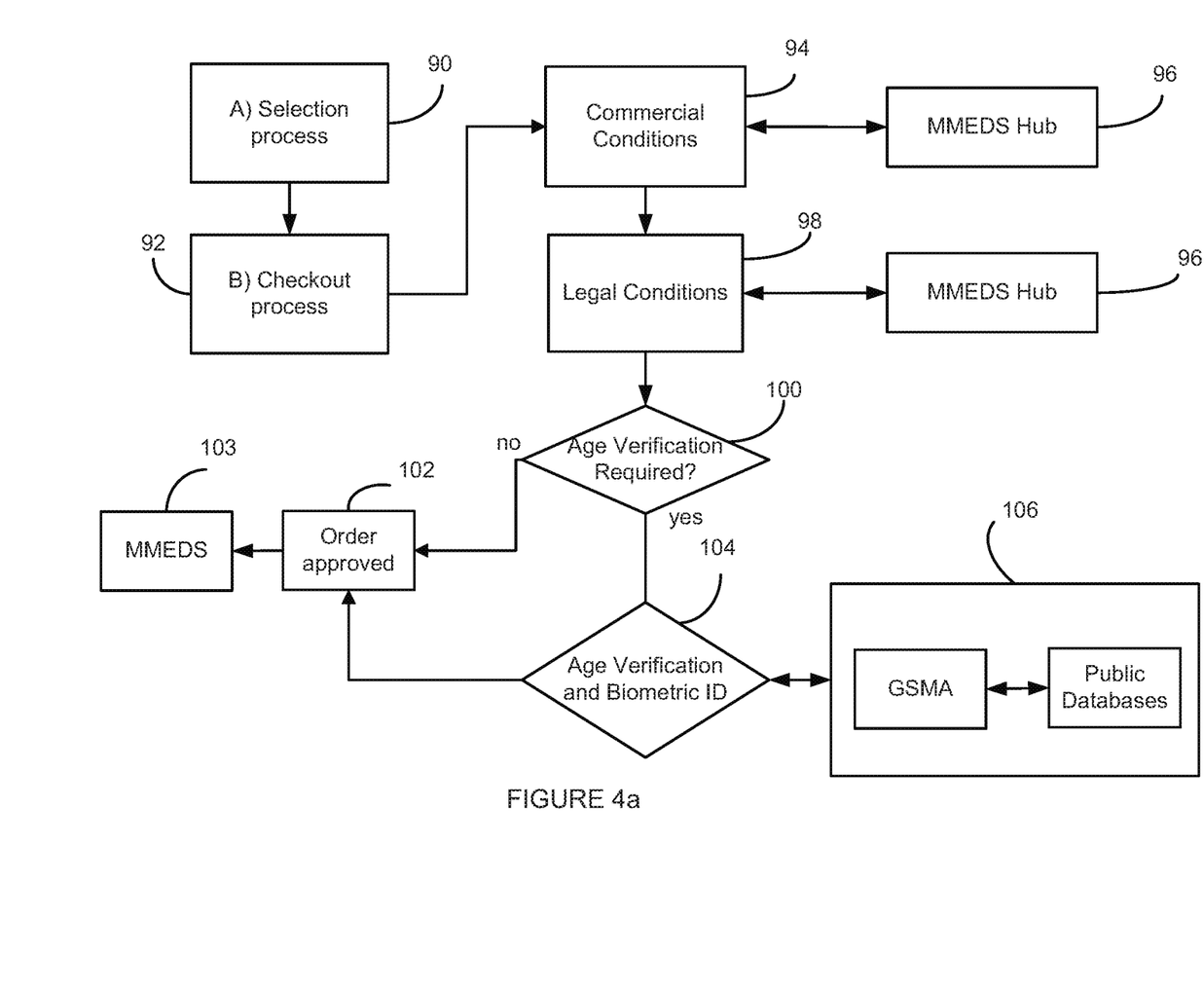
FIG. 4a is a schematic illustration of a method of ordering a product, according to alternative embodiments of the invention.
Figure 4B:
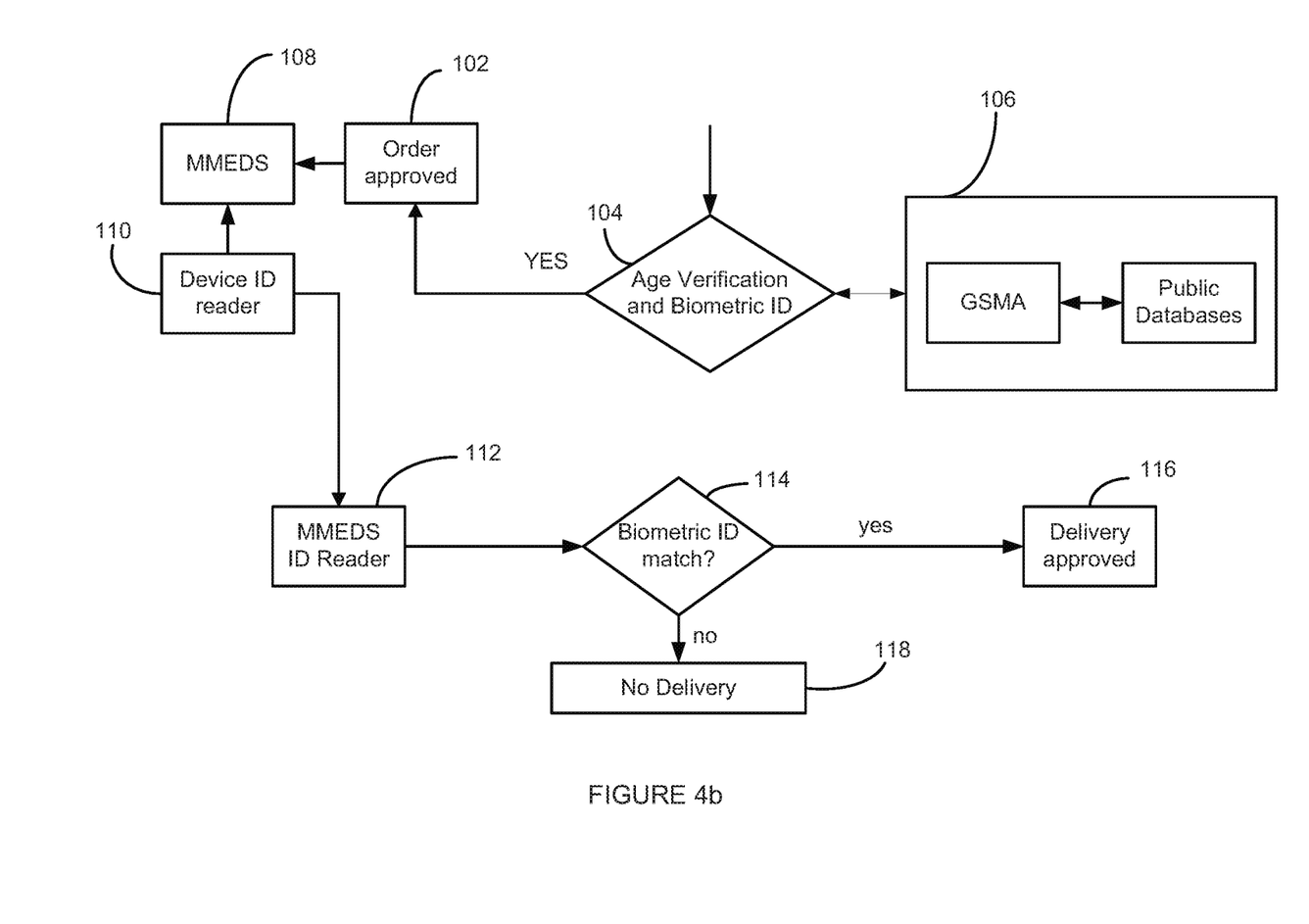
FIG. 4b is a schematic illustration of an authentication method, according to exemplary embodiments of the invention.

A schematic illustration of an exemplary method of ordering a product in advance, including authentication of the user/purchaser, according to embodiments of the invention, is shown, schematically, in FIGS. 4*a* and 4*b*. This method can be used to order a product for immediate delivery or in advance of arriving at the machine, when authentication of an attribute of the user/buyer is required, solely using an app (software application) running in the user's smart device, or, as previously noted, through conventional internet access. In order to utilize the advance order option, at the time of registration, the user's fingerprint, or other biometric identifier is input to the server, as via the user's smart device, and stored in the hub server 38 (see FIG. 2).

According to either option, the transaction begins with the selection process, including identification of pickup location, and product selection, for example, as described in connection with FIG. 3 (block 90). If later collection from a selected MMEDS is desired, that is also indicated.

The method then proceeds to the checkout process (block 92), including compliance with all required conditions. The commercial conditions are selected (block 94), e.g., payment and/or redemption. This is verified with the central hub (block 96). Once the proposed commercial conditions are accepted, the existence of legal conditions or requirements such as described above is determined (block 98). For example, the legal conditions can include the location and/or hour of the day permitted for the transaction. If the permitted times for the transaction change from day to day, the day the transaction will be completed is also verified (block 99).

Then, it is determined if there is an age requirement applicable to the proposed transaction (block 100). If not, the order is approved (block 102) and the delivery device is enabled to dispense the product on demand or at a desired delivery time if the user has so specified (block 103).

As shown in FIG. 4*a*, if age verification is required, an age verification and biometric identification process is carried out (block 104) using an appropriate data source (block 106) for age verification. This can be accomplished according one of several options such as described above. For the embodiments of FIGS. 4*a* and 4*b*, verification can be provided from a private database such as the GSMA Mobile Connect, a service provided worldwide by Groupe Speciale Mobile (originally formed by the Confederation of European Posts and Telecommunications (CEPT) to design a pan-European mobile technology) and now available world-wide.

If the user's/purchaser's age is required, to be verified for the transaction, the user/purchaser will be prompted to input his or her fingerprint (or other biometric identifier) via the smart device for confirmation of his or her identity. The server will confirm that the input biological identifier belongs to the verified user/purchaser, and the order will be approved (block 102).

If the product or service is not to be collected immediately, the user can arrange for the authorized order to be held in stand-by mode. This can be accomplished by again inputting (block 110) the user's unique biometric identifier, such as a fingerprint, through the central hub to the dispensing device (block 108). When the user reaches the dispensing device, which can be immediately or after a specified or unspecified period of time, the user supplies his or her biometric identifier to a biometric data input unit that is part of the dispensing device (block 112). The biometric identification data provided by the user is then transmitted to the hub for confirmation of the user's identity, for example by comparing the transmitted fingerprint to one provided through the user's smart device when the order was placed (block 114). If the two fingerprints match, the delivery is approved and the user can remove the ordered product (block 116). If there is no match, the product will not be delivered (block 118).

According to another optional feature of the invention the system may be used to implement a method of providing information and tax payment to a tax authority. As will be appreciated, many transactions are subject to local sales taxes or value added taxes based on the sale price. Other transactions, particularly through vending systems, may be tax exempt, depending upon the type of goods and services and/or upon the location of the dispensing device. As will also be appreciated, the operator of the dispensing device is responsible for collecting the tax on taxable items, reporting the sale, and remitting the tax. At present, this process can be time consuming and burdensome especially for operators of systems with many vending locations since operators must obtain the transaction data through off-line data collection systems and/or via manual processes and then must prepare reports to the Tax Authority.

According to some embodiments of the invention, this tedious activity conveniently can be automated by data processing performed at the central hub and transmission of data to a relevant tax authority. In some embodiments, the inventory data, which by definition identifies the quantity of each item dispensed, is used by service functionalities software 36 (see FIG. 2), in conjunction with sale price, tax rate, and taxability status information stored in an associated database, to generate proper reports and to communicate the information to a server 40 at the tax authority office.

At the same time, service functionalities software 36 may initiate transfer of the required tax payment from the account of the system owner or brand owner to an account of the tax authority.

Still referring to FIG. 2, in some instances, certain users, for example tourists, may be exempt from taxes such as value added tax. To account for such situations, the software running on user's smart device 34, the dispensing device 32 and the central hub software 36 may be programmed so that the user identification data may be used to recognize such situations and adjust the transaction price accordingly or report the tax paid to the proper tax authority for refund to the user.

As will be appreciated, some items will sell more readily in some location than in other locations. According to another feature of the invention, the system may be used by system operators and owners of brands of items distributed through the dispensing devices to make informed decisions as what items and how many of each should be stocked in the dispensing devices according to their respective locations.

Still referring to FIG. 2, in such embodiments, the inventory data transmitted by the software running on the dispensing devices 32 is used by the central hub software 36 to correlate item popularity with dispensing device location and to provide reports to system operators indicating advantageous stocking patterns for the dispensing devices according to their location.

Similar information can be transmitted to independent databases 38 of brand owners from which they can make informed decisions as to whether particular items should be made available in the dispensing devices instead of or in addition to those being stocked at that time.

The invention also allows the concepts of targeted marketing to be applied effectively in the vending machine environment. Targeted marketing is based on the proven fact that consumers are more likely to be influenced by advertising related to their interests and prior purchasing behavior than by generalized advertising. The concept has been utilized in direct mail advertising programs for years and extensively on line in modern times. The technology (data analytics, etc.) for developing targeted advertising is well known to those in the marketing and advertizing professions, and need not be discussed in detail here.

Despite the available technology, until now, it has not been practical to apply the targeted marketing concept in the context of vending machine sales. A feature of some embodiments of the invention is that the system makes it practical to do so.

Figure 5:
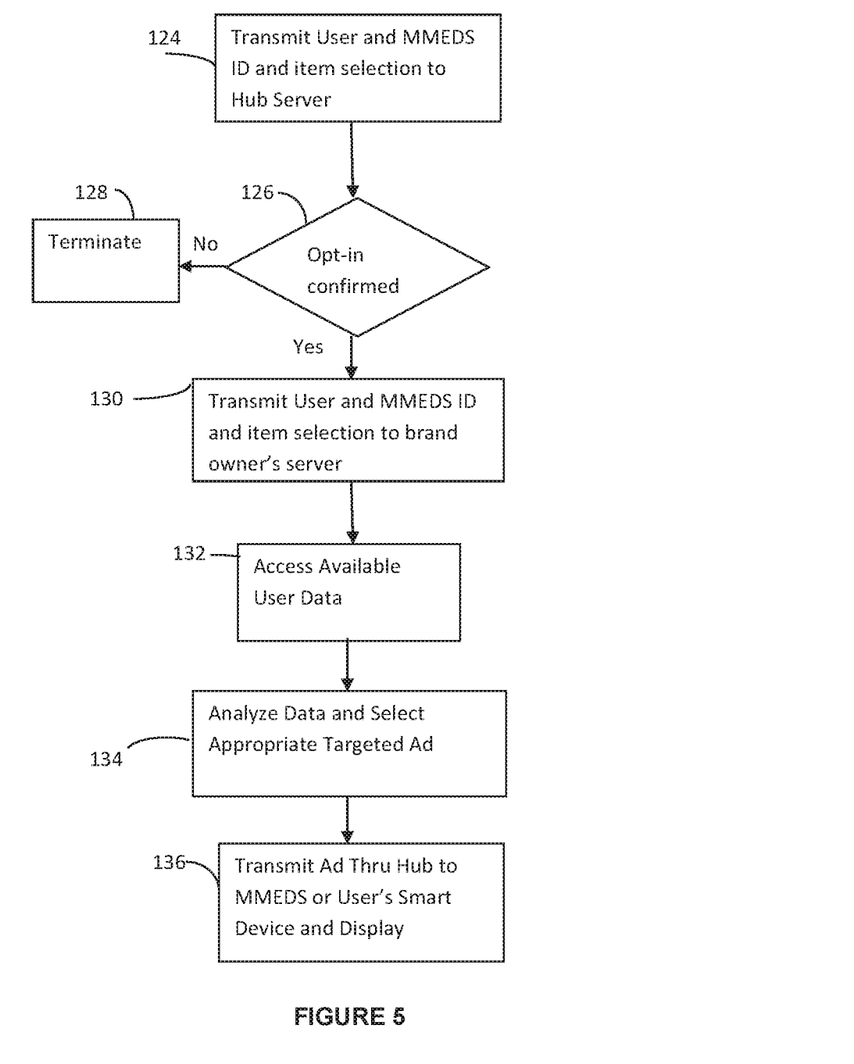
FIG. 5 illustrates a method of generating targeted promotional materials according to an exemplary embodiment of the invention.

Referring to FIG. 5, in embodiments providing targeting marketing capability, after user identification and product selection data are transmitted from dispensing devices 32 to the hub server running functionalities software 36, the information is immediately transmitted to a server associated with the applicable brand owner (block 124). Typically the hub server receives this information before the commercial conditions information is submitted and processed. Immediate transmission to the brand owner's server allows a targeted advertisement to be generated and displayed while the transaction is being processed.

When the identification information is received by the hub server, it performs a preliminary check to be sure that the user has opted in for receiving promotional material (block 126). The opt-in can be invited at the time the user first registers for access to the system and stored with the user's other identifying data at the hub. Optionally, the hub server sends the invitation when it receives the initial identifying data at the time of a transaction.

If the check at block 126 is negative, the targeted advertising process is terminated (block 128). If it is positive, the identifying data is transmitted to a server associated with the brand owner for the selected product (block 130).

At block 132, the brand owner's server accesses all available data concerning the user's transactions involving products of the brand owner, browsing history at the brand owner's web site and any other available information relevant to the user's interests. The information is then analyzed, for example, using the conventional technology mentioned above or proprietary data analysis algorithms or other proprietary techniques of the brand owner, to select promotional information, e.g., from a database of prepared materials, likely to be of interest to the user (block 134). The selected promotional information is then transmitted back through the hub for display to the user (block 136). The information may be transmitted to the user's smart device for display there, to the dispensing device for display on a built-in display device.

Instead of the brand owners' server being located at their own facilities, back offices may be provided by the hub for each brand owner who desires that service. Similar back offices can be provide for system owners and/or maintenance organizations (collectively, clients) registered with the service.

The particular service functionalities can be selected by each client from among the various services provided according to its selected Consumer Relationship Management (CRM) protocols and other needs. This allows the system of the invention to integrate information about a brand's market penetration of items available at dispensing device locations belonging to multiple vendor systems and to gauge the penetration of newly introduced products as relevant for all the system's clients.

The system's clients therefore become part of an intelligent network of dispensing machines and analytical tools (an Industrial Internet of Things) that can provide relevant information periodically, or even essentially in real time. Storing all this business data a central location from which it is accessible (subject to inter-business confidentiality limitations) gives management and employees immediate access to the most recent data when they need it and in the most useful form.

According to some embodiments, when a potential user (whether registered with the system or not), approaches a dispensing device, the processing unit therein can often detect the presence of the user's smart device, for example, by sensing its presence using capabilities provided by Bluetooth, a WiFi connection, a GPS receiver, etc. When the user approaches within a selected distance of its location, the dispensing device can be activated to display a stored message or one transmitted from the central hub server either on its own display device, or on the users' own smart device.

Further, if the dispensing device processor unit is able to recognize the user, the message displayed can be personalized, For example, a generalized message can begin with a greeting including the user's name. Alternatively, a targeted promotional message may be displayed even before a transaction is initiated and even if the identified person had not indicated an intention to initiate a transaction.

For example, if person named Maria walking by the dispensing device is recognized, a screen on the MMEDS machine can display the words, "Hi, Maria. Are you thirsty?" or "Happy Birthday Maria" on a registered user's birthday. The message may optionally be expressed also verbally by a speaker incorporated in the MMDS.

Examples of promotional materials include broadly available special offers or ones personalize for the user. It will be appreciated that promotional messages may also be verbalized to the identified user.

Another option is for the system to establish a frequent user award system which uses purchase history information to reward customer loyalty, for example, with time limited discounts or other special offers, for example, "buy something now and receive a free hot or cold drink with your purchase". Alternatively, a message can be sent simply encouraging participation in the program. As will be understood, the more purchases the user makes, the more he or she reveals about his or her consuming habits and interests, thereby enhancing the effectiveness of the targeted marketing program.

Payment for the selected item will typically be made digitally through the user's smart device. However, the dispensing device can also be used in a more conventional manner by accepting cash, or a credit or debit card. Since such cards provide user identification, details of the purchase can be used in a client's marketing program, as in the case of purely digital transactions.

In addition, the system can be used directly or possibly in conjunction with employed advertising specialists or as a conduit to an advertising agency to create an advertising campaign for a particular product of a client. The Client can input its target audience, goals, the channels over which it prefers to advertise, steps of an action plan, etc. The system can supplement the information provided with statistics of various dispensing devices in a designated geographical location over time, can analyze the data and present it in a usable form for the human participant in the process. It can even suggest images, music, etc., pre-stored in the system or gathered from a focused internet search to help create an appropriate advertising campaign that meets the input requirements. Such computer-human interaction is conventional in the advertising industry, but has never been applied in the context of dispensing device networks.

Figure 6:
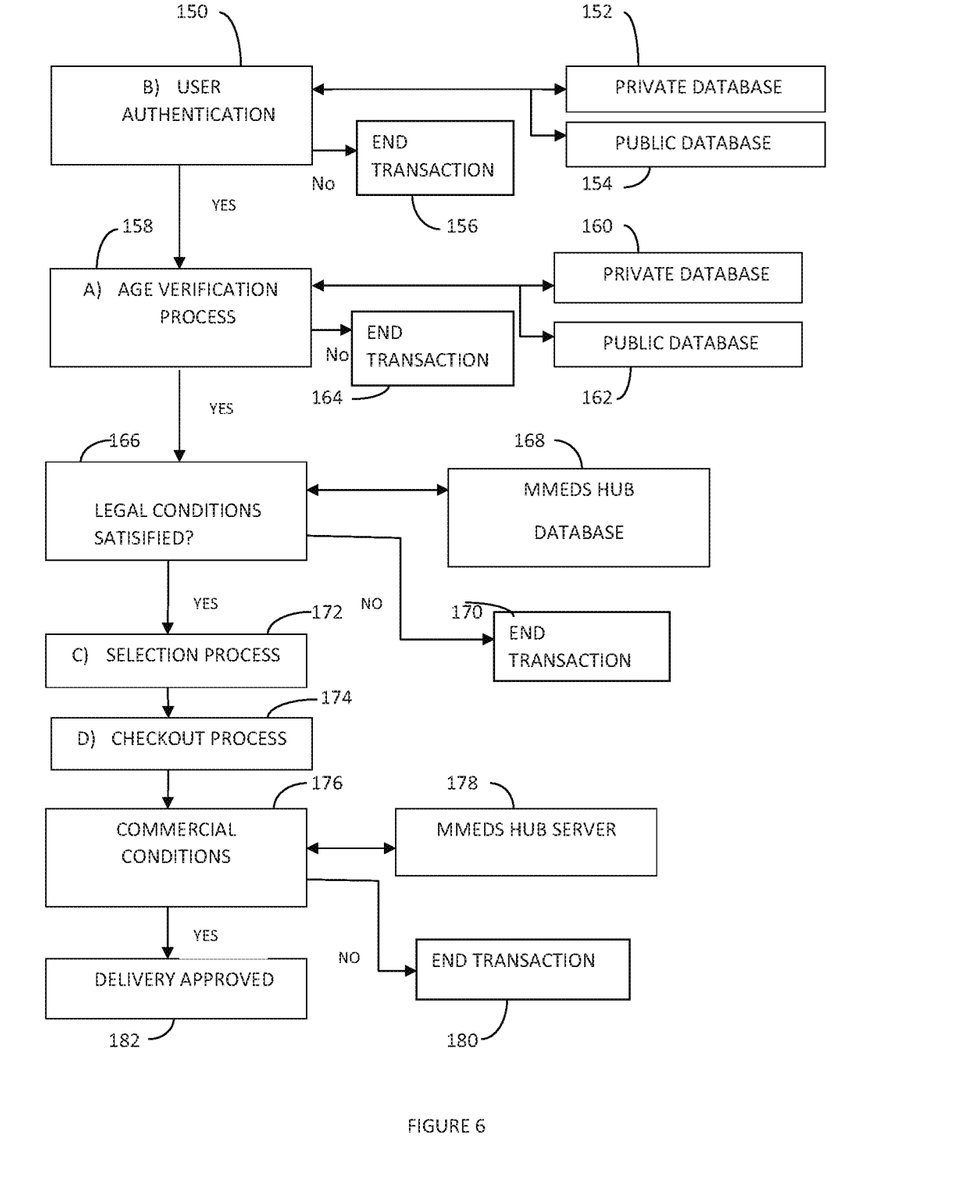
FIG. 6 is a schematic illustration of a method of ordering a product, according to further alternative embodiments of the invention.

If should be noted that the steps of the methods described are performed in a particular order for purposes of illustration and not by way of limitation. Depending on the circumstances, a different order of performance may enhance the efficiency of the transaction. An example of a variation particularly applicable to MMEDS that can deliver tobacco products or alcoholic beverages is illustrated in FIG. 6.

Here, after a transaction is initiated as previously described, the next action is user authentication (block 150), for example, using biometric data provided as previously described by way of a private database 152 and/or a public database 154. If the potential user cannot be identified, the transaction immediately ends (block 156).

If the user's identity is established, age verification is performed (block 158) through access to a private database 160 and/or a public database 162. Optionally, the same data bases can be used for identity and age verification. Optionally, the two verification steps can be performed concurrently. As will be understood, if the user's age eligibility cannot be verified, the transaction ends (block 164).

If the user's age eligibility is been established, the transaction proceeds to a determination if any other legal requirements exist and are satisfied (block 166). Information as to such requirements may be stored in a database 168 associated with the central hub, as previously noted. If such legal requirements exist and are not met, the transaction ends (block 170).

If all existing requirements are met, the transaction proceeds through an item selection process (block 172), and a checkout process (block 174), a verification of commercial conditions (block 176) through access to hub server (block 178), all of which may be performed as previously described. If the user's proposed commercial conditions are not accepted, the transaction ends (block 180). If they are accepted, the delivery is approved, and the selected item is delivered (block 182).

In summary, it should be understood that implementation of some of the functions according to the method and/or system of embodiments of the invention has been described as utilizing conventional data processing technology. In the interest of brevity, details about how such technology is used to generate the required programming and the details of such programming has not been discussed since it is well known to those skilled in the art, On the other hand, system architecture and program functions representing features of the invention have been fully disclosed and illustrated as necessary.

For example, hardware for performing selected tasks according to embodiments of the invention could be implemented as an ASIC chip or a circuit in conjunction with suitable commercially available storage and memory devices, a display device, a biometric scanner, and network connectivity devices. Optionally, user input devices such as a keyboard, touch screen, mouse or voice recognition may be provided by the dispensing device, for example, for users not having a smart device.

It should further be understood that unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. A remotely controlled system for dispensing articles or services comprising:
   (a) a central hub including a server running software for implementing system functionality;
   (b) a dispensing device connected to the hub server by a communication channel and including a processing unit responsive to external commands to operate the dispensing device;
   (c) a server associated with a brand owner whose product or service is available from the dispensing device;
   (d) wherein the hub server and the dispensing device processing unit cooperate responsive to a request of a user to purchase a selected item or service to be dispensed by said dispensing device said request provided from a the user's smart device over a communication channel to identify the user, and, subject to prior approval of the user, to provide identification information of said user and identification of said purchased item or service selection to the brand owner's server; and wherein,
   (e) the brand owner's server is programmed to be responsive to the user identification and the purchased item or service selection information provided to it to record information associating the selected product or service with the user and to generate targeted marketing information that is transmitted through the central hub server for delivery to the user; and
   (f) the hub server is further configured to compute advantageous stocking patterns as a function of selection pattern data from dispensing devices at different locations and send inventory control alerts to the brand owner's server in accordance with said stocking patterns.

2. A system according to claim 1, wherein the positive identification is based on biometric data which is obtained by an input unit at the dispensing device or the user's smart device.

3. A system according to claim 1, wherein the central hub is accessible as a service of one or more social media websites.

4. The system according to claim 1, wherein the brand owner's server is further programmed to gather information on the user from sources other than the ongoing transaction, and to generate the targeted marketing information based on all the gathered information.

5. The system according to claim 1, including a plurality of dispensing devices, at least some of which are located remotely from the central hub.

6. A system according to claim 1, further configured to allow the user to withhold providing their said user identification to said brand owner's server.

7. A system according to claim 1, wherein the dispensing device perform one or more of:
   (i) providing information to a tax authority concerning taxable transactions;
   (ii) transferring payment of taxes due to an account of the tax authority;
   (iii) accessing a data source to obtain positive identification of a potential user and his or her age and/or compliance with other legal requirements applicable to a requested transaction; and
   (iv) providing to the system manager selection pattern data from the dispensing devices to facilitate decisions as to what items or services should be available from the dispensing devices in particular locations.

8. A system according to claim 1, wherein the hub server is responsive to commands from software resident on a user's smart device or to commands from the user's smart device provided through conventional web access services or to commands directly inputted by a user through a dispensing device.

9. A system according to claim 1, wherein the hub includes back office server functionality for brand owners operative to perform selected data analysis functions.

10. A remotely controllable dispensing device comprising:
    storage units for items deliverable from the dispensing device;
    a processing unit connectable to a central hub through a communication channel, and
    a visual display unit;
    wherein the processing unit is remotely controllable by transaction request instructions to purchase an item or service originating from a user's smart device or to instructions to purchase an item or service provided through an input device that is part of the dispensing device itself to initiate identification of the user and verification that the requested transaction is legally permissible and satisfies commercial conditions for the identified user, and to deliver said purchased item or service if legal and commercial conditions are satisfied, wherein the processing unit is further operative to provide operational status to the hub and responsive to completion of a transaction, to transmit inventory status information to the hub and to information provided from the hub to operate the visual display unit to deliver a marketing message targeted to the identified user; and
    the processing unit, in cooperation with the central hub, is further operative to collect data reflective of tax due on transactions at a dispensing device in the system;
    transmit the collected information to a relevant tax authority; and
    transfer the tax due to an account of the tax authority.

11. A dispensing device according to claim 10, wherein the device further includes a biometric data input unit.

12. A dispensing device according to claim 10, that is also operable to deliver audible messages to users.

13. A system according to claim 10, wherein said smart device and hub server are configured to be in communication for pre-order, for immediate purchase, or any combination thereof.

14. A method of operating an article distribution system to conduct a transaction by delivery of an item or service selected by a user from among one or more available options, the selection being made using a smart device, the method comprising:
    disposing a dispensing device including a processing unit in a selected location;
    establishing a communication channel between the dispensing device and a central hub;
    transmitting a user request to purchase a selected item or service, to the dispensing device;
    verifying that the requested transaction is permissible;
    transmitting approval for the transaction through the communication channel to the dispensing device;
    delivering the selected purchased item or service to the user in response to the transmitted approval;
    transmitting inventory status information from the dispensing device to the hub server; and
    subject to prior approval by the user, providing identification information of said user and of said purchased item or service to a brand owner's server in response to said purchase and delivering a targeted promotional message to the user during the transaction, the content of which is determined at least in part by information about the user's prior purchases of items from delivery devices and by other information likely to be reflective of the user's interests;
    wherein the method further comprises:
    collecting data reflective of tax due on transactions at a dispensing device in the system;
    transmitting the collected information to a relevant tax authority; and
    transferring the tax due to an account of the tax authority.

15. A method according to claim 14, further including transmitting operational status information from the dispensing device to the hub server.

16. A method according to claim 14, wherein the transaction is controlled by software running on the hub server accessed by the user through available web access software alone or in cooperation with software running on a user's smart device or accessed through an input device in the dispensing device.

17. A method according to claim 14, further comprising:
    determining if the transaction is subject to an age requirement, and if it is, obtaining a positive identification of the user by the dispensing device; transmitting the identification information to the hub server;
    correlating the identification data with data in a database containing verified age data for the user; and
    transmitting permission for the transaction to the dispensing device if it is permitted.

18. A method according to claim 17, wherein the user identification data is obtained by a biometric scan performed by the dispensing device or the user's smart device and the user's identity is confirmed by accessing an external database to correlate the user's identification data so obtained.

19. A method according to claim 14, wherein the message is delivered to the user by way of his or her smart device or a display unit that is part of the dispensing device.

20. A method according to claim 14, further comprising establishing back office server capability for brand owners, wherein the back offices provide functions selected by the respective brand owners.

21. The method of claim 14, wherein said step of delivering a targeted promotional message comprises displaying the message on said dispensing device, on a smart device of said user, or any combination thereof.

22. The method of claim 14, further comprising a step of displaying a said targeted message to said user when the user is in proximity to said dispensing device without making a purchase.

23. A remotely controlled system for dispensing articles or services comprising:
  (a) a central hub including a server running software for implementing system functionality;
  (b) a plurality of dispensing devices connected to the hub server by a communication channel and each said dispensing device including a processing unit responsive to external commands to operate the dispensing device;
  (c) a server associated with a brand owner whose product or service is available from the dispensing device;
  (d) wherein the central hub is responsive to a request of a user to purchase a selected item or service to be dispensed by said dispensing device said request provided from the user's smart device over a communication channel to identify the user; and
  (e) central hub is further operative, upon said user's consent, to verify, with an external database maintained by a public or private entity, one or more of said user's personal attributes regarding fulfillment of legal requirements of said purchase which are based on said personal attributes; and
  (f) the central hub is further responsive to a request by the user of a location of a said dispensing device for pickup of said purchased item.

24. A system of claim 23, wherein a said verification of personal user attributes is performed during said purchase and during said pickup.

25. A system of claim 24, further comprising a biometric data input unit, wherein said central hub is further configured to correlate biometric data of the user with said external database to authenticate the user in said fulfillment of legal requirements.

26. A system according to claim 25, wherein the biometric data unit is at the dispensing device, at the user's smart device, or any combination thereof.

27. A system according to claim 26, wherein said biometric data comprises facial, retinal, fingerprint scan, or any combination thereof.

28. A system according to claim 23, wherein said external database is of a government, a bank, or a mobile operator.

29. A system according to claim 28, wherein said legal requirements comprise a minimum legal age for said purchase.

* * * * *